Patented Feb. 8, 1949

2,461,152

UNITED STATES PATENT OFFICE 2,461,152

CELLULOSE ESTERS OF AMINO ACIDS

Thomas S. Gardner, Kingsport, Tenn., assignor to Eastman Kodak Company, Rochester, N. Y., a corporation of New Jersey No Drawing. Application November 8, 1945, Serial No. 627,549

7 Claims. (Cl. 260—225)

This application relates to the preparation of cellulose esters of amino acids by esterifying cellulose derivatives having free and esterifiable hydroxyl groups with amino acids which have first been acylated by means of acylating agents.

The cellulose derivatives having a basic nitrogen content have been of considerable interest, mainly because of their susceptibility to acid wool type dyes. Therefore, numerous investigators have worked out processes for preparing cellulose derivatives of this type but up to the present time none of the methods suggested has given products which have found commercial usefulness. Probably the most favored method which has been suggested up to now involves the reaction of cellulose material containing free and esterifiable hydroxyl groups with para-toluene sulphonyl chloride to form that derivative of cellulose followed by its reaction with ammonia or a primary amine to form an amino cellulose. This is the method suggested in U. S. Patents Nos. 1,833,286 of Hagedorn and 2,138,778 of Rigby. Also, several articles found in the literature refer to this method of making amino derivatives of cellulose. The products obtained by the action of ammonia and para-toluene sulphonyl esters of cellulose have been so poorly defined that most investigators consider that only very little reaction had occurred. At least this method has not been found to be sufficiently practical to be adapted for commercial purposes.

Another instance in which basic nitrogen has been introduced into a cellulose derivative is that described in British Patent No. 344,480 of Dreyfus. That method involves the reaction of a cellulose derivative with thionyl chloride followed by substitution by amino or substituted amino groups of the chlorine atoms in the cellulose derivatives. Various other methods have been suggested for introducing basic nitrogen into cellulose derivatives. One of the disadvantages which has been met with in many of these suggested processes is a resulting excessive degradation of the cellulose due to the severity of the method employed.

It is an object of my invention to provide a process for preparing cellulose derivatives containing basic nitrogen in which excessive degradation of the cellulose is avoided. Another object of my invention is to provide cellulose derivatives containing basic nitrogen thereby rendering those derivatives susceptible to dyeing by acid wooltype dyes. A further object of my invention is to provide cellulose derivatives containing basic nitrogen in the form of filaments or yarn useful for textile purposes. A still further object of my invention is to provide a process for preparing cellulose esters employing amino acids in the esterification process. Other objects of my invention will appear herein.

I have found that cellulose esters containing basic nitrogen may be prepared by esterifying cellulose derivatives containing free and esterifiable hydroxyl groups with amino acids which have first been acylated, involving the use of an impelling anhydride and an esterification catalyst. I have found that by this process cellulose derivatives containing basic nitrogen can be obtained without degrading the cellulose molecule thereby making possible the obtaining of products which are useful for various commercial processes, particularly for the making of filaments or yarn.

In its broadest aspects my invention involves reacting upon an amino acid with an acylating agent so as to introduce at least one acyl group on the nitrogen of the acid followed by reacting that acyl-substituted amino acid with a cellulose derivative having free and esterifiable hydroxyl groups using an impelling anhydride and an esterification catalyst to promote the reaction.

Some of the cellulose derivatives which are suitable for use as a starting material in my invention are cellulose esters such as cellulose acetate or acetyl containing mixed esters containing free and esterifiable hydroxyl groups. These esters contain hydroxyl groups by virtue of the hydrolysis operations ordinarily employed in making them. For instance, ordinary commercial cellulose acetate is a hydrolyzed cellulose acetate and is suitable for use as the starting material in processes in accordance with my invention. Ordinarily with cellulose acetate those esters which have been hydrolyzed down to an acetyl content within the range of 30 to 40% will be found to be most suitable for preparing nitrogen-containing derivatives in accordance with my invention. The cellulose ester selected for the starting material will be governed to some extent by the amount of basic nitrogen which it is desired to introduce, for instance, a cellulose acetate having an acetyl content in the lower part of the 30 to 40% range, assuming acetyl is the only acyl present, will result in esters having a higher basic nitrogen content than those having more acetyl and less free and esterifiable hydroxyl groups. With the mixed esters, such as cellulose acetate propionate or cellulose acetate butyrate the desirable starting materials will be those esters having at least one free hydroxyl group for every $C_6$ unit of cellulose, the amount of hydroxyl being varied depending upon the proportion of basic nitrogen which it is desired to introduce into the cellulose derivative. The cellulose esters preferred for use are those whose acyl is principally saturated fatty acid groups of 2–4 carbon atoms. These esters are known as "lower fatty acid esters of cellulose."

Although cellulose esters are preferred as the starting material in my process, if desired, a cellulose ether containing free and esterifiable hydroxyl groups may be employed as the starting material, the preferred range of hydroxyl being from ½ to 1½ hydroxyl groups per $C_6$ unit of cellulose, both for the cellulose esters and for the cellulose ethers.

It is desirable in preparing the cellulose derivatives that a dope method be used or in other words that the cellulose derivative be in solution in the reacting mixture. As the starting material, it will therefore be desirable to employ material which is soluble in a solvent compatible with the esterification conditions. It is to be understood, however, that fibrous esterification processes are not excluded from the scope of my invention if the operator desires to carry out the esterification processes in the presence of a non-solvent.

The amino acid which is to be employed in the esterification process of my invention is first acylated with an appropriate reagent thereby blocking off the most active of the amino hydrogens of amino acid. This may be accomplished in any manner commonly known for acylating acids, such as by the use of acid halide (acetyl chloride) or preferably by the use of acetic anhydride such as by the method described in "Organic Syntheses," Col. Ed., II, p. 11. The method used, however, is not critical providing one of the amino hydrogens of the amino acid is acylated prior to the esterification process. If desired, the acylated amino acid may be procured from some supplier and used in the esterification process. The important point is that the most active amino hydrogen of the amino acid is blocked off by means of an acyl group in place of that hydrogen. Nevertheless, the acyl group of any other organic acid which will replace the amino hydrogen and will remain united with the nitrogen of the amino acid during the esterification process is suitable for use in my invention.

The esterification of cellulose derivatives with the acylated amino acid is satisfactorily carried out by the use of monochloro acetic anhydride as the impeller and magnesium perchlorate as the catalyst. The use of this anhydride for esterification purposes is described in U. S. Patent No. 1,880,808 of Clarke and Malm and the disclosure of that patent is to be understood as constituting part of the disclosure of this specification. Instead of chloro acetic anhydride other impelling anhydrides may be employed to promote the esterification, such as alkoxyl substituted fatty acid anhydrides. The use of anhydrides of this nature as impellers in esterification reactions is described in 1,987,053 of Clarke and Malm, and the disclosure of that patent is incorporated in this specification as showing impelling anhydrides and esterification conditions suitable for use in esterifications in accordance with my invention.

Magnesium perchlorate has been found to be a useful catalyst in esterifications of the type described herein and, therefore, its use is recommended in esterification processes in accordance with my invention. Nevertheless, other acid catalysts may be employed in promoting esterifications of this nature, such as sulphuric acid, phosphoric acid, zinc chloride or the like, the choice of catalyst depending upon the type of product desired. If a quick reaction is desired and the severity of the conditions can be controlled, obviously a more active catalyst would be selected than where the avoidance of severe conditions is important.

The per cent of nitrogen obtained in the final product not only is limited to the proportion of free and esterifiable hydroxyl groups in the cellulose derivative used as the starting material but is also related to the activity of the acylated amino acid, the amount of the acid used in the esterification process, the length of time of reaction, the rate of reaction and the temperature at which it is carried out. With the use of an impelling anhydride and magnesium perchlorate as the catalyst, it is desired to carry out the reaction at a temperature between 50 and 65° C. as above that temperature degradation must be avoided while below 50° C. the reaction proceeds at a slow rate. With the use of a more vigorous catalyst, lower temperatures may be employed to promote esterification processes. If desired, after the esterification of the cellulose derivative has occurred, the product may be subjected to hydrolysis such as by adding dilute aqueous acetic acid in an amount sufficient to react with the anhydride present followed by allowing the mass to stand for a time at 100° F. This standing of the cellulose derivative while in solution slowly releases acyl groups from the product, particularly if a small percentage of water is present in the mass which is allowed to stand. The following examples illustrate my invention.

*Example 1.*—Twenty grams of hydrolyzed cellulose acetate having 35.7% acetyl and 0.94 mole of free hydroxyl were dissolved in 300 cc. of dry dioxane. There was added to this solution 80 g. of N-acetyl α-amino isobutyric acid, 80 g. chloro acetic anhydride and 0.4 g. of magnesium perchlorate. The mass was stirred for four hours at 65° C. The completed reaction mass was precipitated in water, washed, dissolved in acetone, filtered, and re-precipitated in aqueous sodium bicarbonate solution. The material was again washed, dissolved in acetone, precipitated and washed well in water (the extreme care in purifying the sample was necessary for analysis and would not ordinarily be desirable). On drying, a fibrous, acetone, soluble, white material containing acetyl and acetyl α amino isobutyryl groups was obtained. The yield of cellulose derivative was 20.5 g., which product had a nitrogen content of 3.21%.

*Example 2.*—The above procedure was repeated except that the starting material was a cellulose ester having an acetyl content of 33.9%, a propionyl content of 1%, and a hydroxyl content of 7.29%. A yield of 22.5 g. and a nitrogen content of 1.43% was obtained.

Example 1 was repeated except that the acetyl derivatives of other amino acids in accordance with the description were used. The results in tabular form are as follows:

| | Diester, grams | Yield in Grams | Percent N | Amino Acyl Moles | $(\eta)$ | Color |
|---|---|---|---|---|---|---|
| Cellulose Acetate Diester | | | | | 1.29 | |
| N-acetyl: | | | | | | |
| Glycinate | 20 | 20 | 1.61 | 0.32 | 1.25 | Yellow. |
| dl-α-alaninate | 20 | 21 | 3.21 | 0.77 | | Do. |
| dl-α-alaninate | 12 | 14 | 3.25 | 0.78 | | Do. |
| dl-β-alaninate | 20 | 22 | 2.04 | 0.43 | 1.25 | White. |
| d-Glutamate | 20 | 19 | 0.80 | 0.16 | 1.32 | Do. |
| α-amino isobutyrate | 20 | 20.5 | 3.21 | 0.81 | 1.16 | Do. |
| p-amino benzoate | 20 | 3.5 | 1.32 | 0.28 | 1.26 | Do. |
| p-amino benzoate | 15 | 3.0 | 2.03 | 0.43 | 0.89 | Do. |

The intrinsic viscosities of the products are given to show that the various products are substantially free of degradation by the method in accordance with my invention. These viscosity determinations were made by dissolving 200 milligram samples in glacial acetic acid and determining the relative viscosity in a Fenske-Ostwald pipette at 25° C. The intrinsic viscosity was calculated from Kramer's equation:

$$(\eta) = \left(\frac{\ln \eta_r}{c}\right)_c \rightarrow 0^1$$

[1] Kramer, Ind. Eng. Chem. 30, 1200 (1938).

Wherein $\eta_r$ = relative viscosity (viscosity of solution divided by viscosity of solvent).
$c$ = concentration of solute, grams per 100 ml. solution.

The viscosity of the dl-α-alaninates was not determined as those products were not soluble in acetic acid.

The products in accordance with my invention were found to be eminently suitable for the preparation of filaments of yarn therefrom. For instance, the product of Example 1 was dissolved in acetone and extruded through a spinneret under evaporative conditions to form yarn thereof. The resulting yarn was dyed with xylene-brilliant-blue to give a yarn having a distinctive blue color. Yarn was also prepared in the same manner from cellulose acetate N-acetyl d-glutamate having a nitrogen content of 0.8%. This yarn was also found to be excellently susceptible to dyeing with xylene-brilliant-blue. Yarn prepared from cellulose acetate showed no coloration upon dyeing with this blue dye. Other of the products were dyed with wool-type dyes and were found to show a distinctive color upon the dyeing operation. The derivatives of cellulose-containing nitrogen as described herein are also useful for use in preparing sheeting which may be colored and plastics suitable for use for the preparation of tinted materials using acid dyes.

I claim:

1. Cellulose acetate N-acetyl-α-amino isobutyrate.

2. A process of making cellulose derivatives receptive to the action of wool-type dyes which comprises esterifying a lower fatty acid ester of cellulose containing free and esterifiable hydroxyl groups with N-acetyl-α-amino isobutyric acid by means of an impelling anhydride and an acidic esterification catalyst.

3. A process of making cellulose derivatives receptive to the action of wool-type dyes which comprises esterifying a cellulose acetate containing free and esterifiable hydroxyl groups with N-acetyl-α-amino isobutyric acid by means of an impelling anhydride and an acidic esterification catalyst.

4. A mixed ester of cellulose of a lower fatty acid and an acid having the formula:

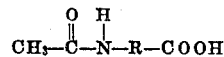

R being selected from the group consisting of aliphatic radicals and $C_6H_4$.

5. A mixed ester of cellulose of acetic acid and an acid having the formula:

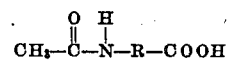

R being selected from the group consisting of aliphatic radicals and $C_6H_4$.

6. A process of making cellulose derivatives receptive to the action of wool-type dyes which comprises esterifying a lower fatty acid of cellulose containing free and esterifiable hydroxyl groups with an acid having the formula:

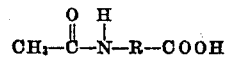

R being selected from the group consisting of aliphatic radicals and $C_6H_4$ by means of an impelling anhydride and an acidic esterification catalyst.

7. A process of making cellulose derivatives receptive to the action of wool-type dyes which comprises esterifying a cellulose acetate containing free and esterifiable hydroxyl groups with an acid having the formula:

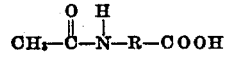

R being selected from the group consisting of the aliphatic radicals and $C_6H_4$ by means of an impelling anhydride and an acidic esterification catalyst.

THOMAS S. GARDNER.

REFERENCES CITED

The following references are of record in the file of this patent:

UNITED STATES PATENTS

| Number | Name | Date |
|---|---|---|
| 2,233,475 | Dreyfus | Mar. 4, 1941 |
| 2,399,603 | Rust | Apr. 30, 1946 |